US012768661B2

(12) United States Patent
Weston et al.

(10) Patent No.: US 12,768,661 B2
(45) Date of Patent: Oct. 20, 2026

(54) SYSTEMS AND METHODS FOR DROPPING OFF A USER AT A DESTINATION LOCATION

(71) Applicant: Ford Global Technologies, LLC, Dearborn, MI (US)

(72) Inventors: Keith Weston, Canton, MI (US); Brendan Diamond, Grosse Pointe, MI (US); Stuart C. Salter, White Lake, MI (US); Anthony Maraldo, Southgate, MI (US)

( * ) Notice: Subject to any disclaimer, the term of this patent is extended or adjusted under 35 U.S.C. 154(b) by 109 days.

(21) Appl. No.: 18/432,908

(22) Filed: Feb. 5, 2024

(65) Prior Publication Data

US 2025/0251247 A1 Aug. 7, 2025

(51) Int. Cl.

*G01C 21/34* (2006.01)
*G01C 21/36* (2006.01)
*H04W 4/44* (2018.01)

(52) U.S. Cl.

CPC ..... *G01C 21/3461* (2013.01); *G01C 21/3492* (2013.01); *G01C 21/3617* (2013.01);

(Continued)

(58) Field of Classification Search

CPC ............ G01C 21/3461; G01C 21/3492; G01C 21/3617; G01C 21/3682; G01C 21/3694; G01C 21/3697; G01C 21/343; H04W 4/44; G05D 1/0088; G05D 1/021; G05D 1/0212; G05D 1/0291; G05D 1/43; G05D 1/617; G05D 1/81; G06F 16/29; G06F 3/0482; G06F 16/215; G06F 16/23; G06F 16/2365; G06F 3/04817; G06Q 10/06315; G06Q 30/0283; G06Q 50/40; G06Q 10/02; G06Q 10/08; G06Q 20/102; G06Q 30/02;

(Continued)

(56) References Cited

U.S. PATENT DOCUMENTS 11,440,490 B2 9/2022 Park et al.
2004/0039919 A1 * 2/2004 Takayama ............. G06Q 20/24 713/180

(Continued)

OTHER PUBLICATIONS

Inwizards Inc., Smart Parking App, https://www.inwizards.com/smart-parking.php, May 12, 2023, pp. 1-5.

*Primary Examiner* — Abby Lin
(74) *Attorney, Agent, or Firm* — Emily Campbell; Eversheds Sutherland (US) LLP

(57) ABSTRACT

A navigation system is disclosed. The system may include a transceiver and a processor. The transceiver may be configured to receive a destination location, a destination location map and information associated with a site of interest in the destination location. The processor may determine an optimal drop-off location, from a plurality of drop-off locations, at the destination location based on the information associated with the site of interest and the destination location map. The processor may further determine a real-time location of a vehicle or a user device and generate navigation (Continued)

instructions to navigate the vehicle or the user device from the real-time location to the optimal drop-off location. The processor may further transmit the navigation instructions to the vehicle or the user device.

20 Claims, 6 Drawing Sheets

(52) U.S. Cl.
CPC ..... *G01C 21/3682* (2013.01); *G01C 21/3694* (2013.01); *G01C 21/3697* (2013.01); *H04W 4/44* (2018.02)

(58) Field of Classification Search
CPC .. G06Q 30/0639; G06Q 50/01; B60N 2/0224; B60N 2/0233; B60N 2/30; B60N 2220/20; B60N 2230/20; B60R 13/0823; B60W 2556/45; B60W 2556/50; B60W 30/06; B60W 60/0025; B62D 15/0285; G01G 19/12; G06N 20/00; G06N 20/20; G06N 7/01; G08G 1/0125; G08G 1/143; G08G 1/146; G08G 1/162; G08G 1/164; G08G 1/202
See application file for complete search history.

(56) References Cited

U.S. PATENT DOCUMENTS

| | | | | |
|---|---|---|---|---|
| 2009/0090785 | A1* | 4/2009 | Ariyoshi | G06Q 20/341 235/494 |
| 2017/0293950 | A1 | 10/2017 | Rathod | |
| 2017/0329346 | A1 | 11/2017 | Latotzki | |
| 2018/0090992 | A1* | 3/2018 | Shrivastava | H02J 50/20 |
| 2019/0114039 | A1* | 4/2019 | Lindemann | G06F 3/167 |
| 2019/0163204 | A1* | 5/2019 | Bai | G06Q 10/047 |
| 2019/0171732 | A1 | 6/2019 | Yanez et al. | |
| 2020/0104962 | A1 | 4/2020 | Aich et al. | |
| 2020/0173799 | A1* | 6/2020 | Chokshi | G01C 21/3461 |
| 2021/0209713 | A1* | 7/2021 | Imtiyaz | G06Q 50/40 |
| 2023/0100961 | A1* | 3/2023 | Pan | G01C 21/3629 701/24 |
| 2024/0027200 | A1* | 1/2024 | Masuda | G01C 21/3415 |
| 2024/0303318 | A1* | 9/2024 | Wright | G06Q 10/083 |

* cited by examiner

SYSTEMS AND METHODS FOR DROPPING OFF A USER AT A DESTINATION LOCATION

FIELD

The present disclosure relates to systems and methods for dropping off a user at a destination location, e.g., at a hotel, a shopping mall, a stadium, and/or the like.

BACKGROUND

When a user hires a taxi to visit a hotel, a shopping mall, a stadium, etc., there may be instances when the taxi driver may drop-off the user at a location that may be far from the user's final destination. This may cause inconvenience to the user, as the user may have to walk considerable distance to reach to the final destination. Similar situation may occur when the user may be driving a vehicle and may not know an optimal parking spot to park the vehicle at such places.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
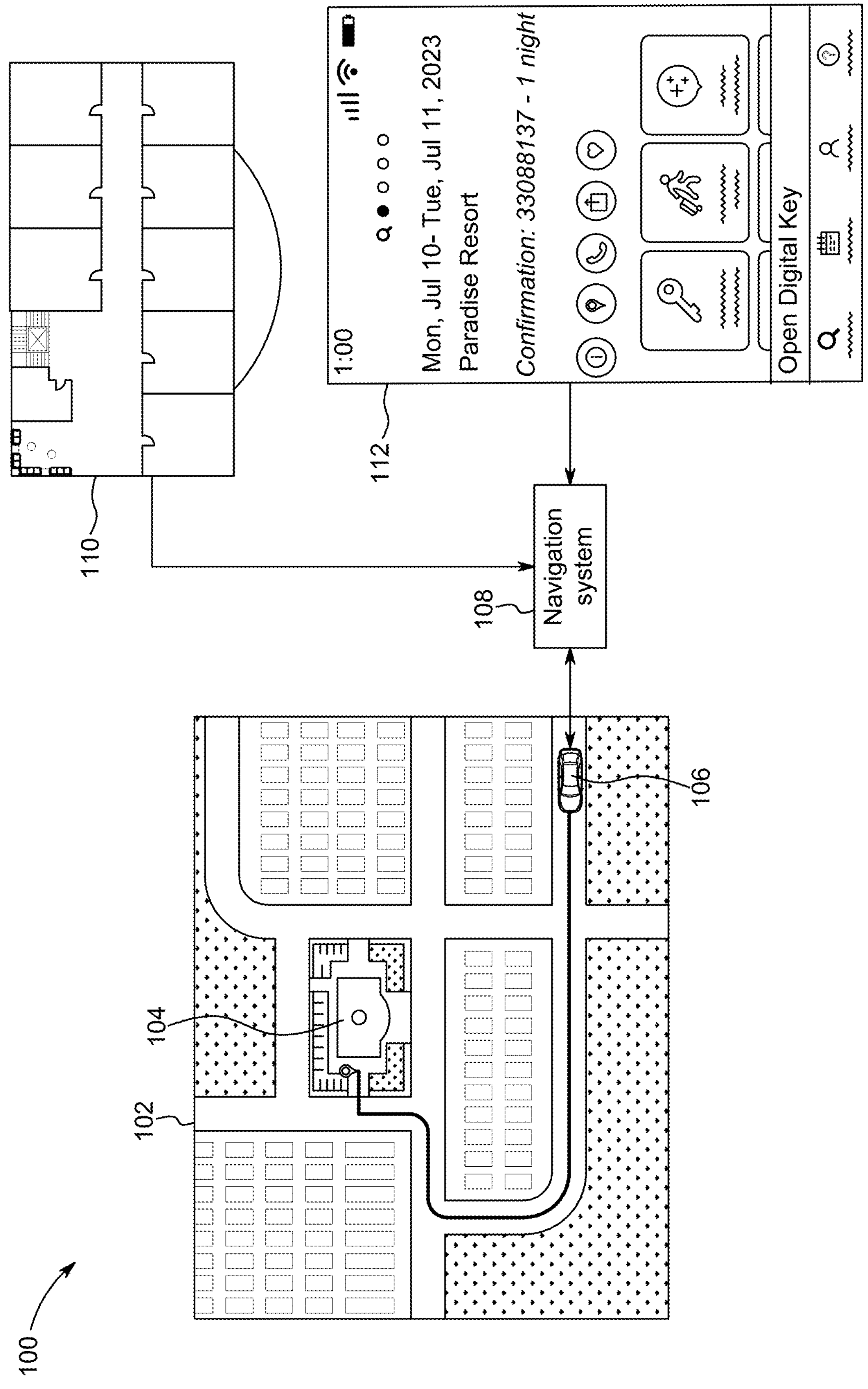
FIG. 1 depicts an environment in which techniques and structures for providing the systems and methods disclosed herein may be implemented.

The present disclosure describes a navigation system ("system") that facilitates a vehicle/taxi to drop-off a vehicle user/occupant at an optimal drop-off location in a building, which may be, e.g., a hotel, a shopping mall, a stadium, an office, a concert venue, and/or the like. The system may enable the vehicle to drop-off the user at a drop-off location that may be closest to a site of interest for the user at the building, thus enabling the user to conveniently reach to the site of interest without having to walk a considerable distance.

As a first example, when the building may be a hotel, the system may determine the optimal drop-off location, from a plurality of drop-off locations at the hotel, based on location of a hotel room that may be booked by the user. In this case, the system may obtain information associated with the hotel room booked by the user (e.g., via a digital key associated with the hotel room issued by the hotel to the user) and a hotel map. The system may correlate the information associated with the hotel room and the hotel map and determine a hotel entrance that may be closest to the hotel room as the optimal drop-off location at the hotel for the user.

The system may further determine a real-time location of the vehicle or a user device associated with the user and may generate navigation instructions to navigate the vehicle/user device from the real-time location to the determined optimal drop-off location at the hotel. The system may further transmit the navigation instructions to the vehicle/user device to enable the vehicle conveniently reach to the optimal drop-off location.

As a second example, when the building may be a shopping mall or an office, the system may determine the optimal drop-off location based on location of a shop or an office section that the user may desire to visit. In this case, the system may determine the optimal drop-off location to minimize walking distance for the user from the drop-off location to the shop/office section. The system may further determine if an exit from the shopping mall/office may be different from the drop-off location. Responsive to determining that the exit may be different from the drop-off location, the system may generate additional navigation instructions to enable the vehicle movement from the drop-off location to the shopping mall/office exit. This may facilitate the user to conveniently board the vehicle when the user exits the shopping mall/office.

As a third example, when the building may be a stadium or a concert venue, the system may determine the optimal drop-off location based on location of a sitting area booked by or allocated to the user. In this case, the system may determine the optimal drop-off location to minimize the walking distance for the user from the drop-off location to the sitting area, or to minimize the overall travel time for the user from the real-time location to the sitting area, or to ensure that the route from the drop-off location to the sitting area passes through a place of interest (e.g., a refreshment station), etc.

The system may further determine the optimal drop-off location based on weather conditions in a geographical area including the building, user preferences, and/or the like. The system may be further configured to generate and transmit navigation instructions to the user device to enable the user to conveniently walk/move from the drop-off location to the site of interest at the building where the user desires to go (e.g., the hotel room, the stadium sitting area, the shopping mall shop, etc.).

The present disclosure discloses a navigation system that facilitates a vehicle/taxi to drop-off a user at a drop-off location that may be closest to the user's final destination, thereby minimizing user's time and effort in walking from the drop-off location to the final destination. The system further provides navigation instructions to the vehicle or a user device associated with the user, thus enabling the user to conveniently reach to the final destination.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102 including a plurality of buildings, a road network, and/or the like. In an exemplary aspect, the geographical area 102 may include a building 104 that may be, for example, a hotel, a shopping mall, an office building, a sports arena or concert venue, and/or the like. The building 104 may include a plurality of entrance locations and one or more exit locations. The entrance locations may be those locations from where users may enter the building interior portion, and the exit locations may be those locations from where the users may exit the building interior portion. In some aspects, vehicles, taxis, buses, etc. may drop-off their occupants in proximity to one of the building entrance locations, and the occupants may then walk from the drop-off/entrance locations to inside the building 104 (e.g., via building doors).

The environment 100 may further include a vehicle 106 that may be travelling on the road network included in the geographical area 102. The vehicle 106 may take the form of any passenger or commercial vehicle such as, for example, a car, a work vehicle, a crossover vehicle, a truck, a van, a minivan, a taxi, a bus, etc. Further, the vehicle 106 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc. In some aspects, the vehicle 106 may be a taxi or a commercial vehicle that may be dropping-off one or more users (not shown) to the building 104. In other aspects, the vehicle 106 may be a private vehicle that may drop-off its occupants at the building 104 and may then be parked at a parking location at or in proximity to the building 104.

The environment 100 may further include a navigation system 108 (or system 108) that may be communicatively coupled with the vehicle 106 (and a plurality of other vehicles located in the geographical area 102), one or more computing devices and/or infrastructure sensors associated with the building 104 (and a plurality of other buildings located in the geographical area 102), and/or the like. The system 108 may be hosted on a server and may be configured to recommend an optimal drop-off location, from a plurality of drop-off locations associated with the building 104, to the vehicle 106 and/or a user device (shown as user device 204 in FIG. 2) associated with a vehicle operator/occupant, so that the vehicle 106 may conveniently drop-off its occupants at the building 104. The system 108 may further generate and transmit navigation instructions to the vehicle 106 and/or the user device, to enable conveniently vehicle movement (or user movement associated with the user device) towards the recommended optimal drop-off location. Example scenarios in which the system 108 determines and recommends an optimal drop-off location to the vehicle 106 and/or the user device are described below. The example scenarios described below should not be construed as limiting, and the system 108 may determine and recommend optimal drop-off locations in other scenarios as well that are not described herein, without departing from the present disclosure scope.

In a first exemplary aspect, when the building 104 may be a hotel, the system 108 may obtain hotel information from the vehicle 106, an external server (shown as server 202 in FIG. 2), the user device, and/or the computing devices associated with the building 104, when the vehicle 106 may be travelling on the road network included in the geographical area 102 or commencing its journey from a vehicle's home location (towards the building location). In some aspects, the hotel information may include a hotel address (or a "destination location"), a hotel map 110 (or a "destination location map"), information associated with a hotel room booked by the user/occupant of the vehicle 106 (or "information associated with a site of interest in the destination location"), and/or the like. In an exemplary aspect, the hotel address may be provided to the system 108 by the vehicle 106 and/or the user device, and the system 108 may fetch the hotel map 110 and the information associated with the hotel room booked by the user/occupant from the external server and/or the computing devices associated with the building 104. In other aspects, the information associated with the hotel room booked by the user/occupant may also be provided by the vehicle 106 and/or the user device. In some aspects, the information associated with the hotel room booked by the user/occupant may be included in a digital key 112 to the hotel room issued by the hotel, and the system 108 may obtain the digital key 112 from the vehicle 106, the user device, the external server, and/or the computing devices associated with the building 104. Further, the information associated with the hotel room may include, for example, a hotel room identifier or a hotel room number.

The hotel map 110 may include a floor map of the hotel and may include location details a plurality of hotel rooms, drop-off locations, exit locations, lobby locations, locations of stairs, elevators, etc., their respective dimensions, and/or the like. The system 108 may be configured to correlate the information associated with the hotel room and the hotel map 110 and identify/determine an optimal drop-off location for the user/occupant of the vehicle 106 based on the correlation. In some aspects, the optimal drop-off location may be that drop-off location, from a plurality of hotel drop-off locations, which may be closest to the hotel room. Responsive to determining the optimal drop-off location that may be closest to the hotel room, the system 108 may determine or obtain a real-time vehicle and/or user device location from the vehicle 106 and/or the user device. The system 108 may further generate navigation instructions to navigate the vehicle 106 and/or the user device from the real-time vehicle and/or user device location to the optimal drop-off location. The system 108 may then transmit the generated navigation instructions to the vehicle 106 and/or the user device, thereby enabling the vehicle 106 to conveniently reach to the optimal drop-off location. In this manner, the system 108 enables the vehicle 106 to drop-off its occupant(s) to a hotel drop-off location that may be closest to the occupant's hotel room (and not any other hotel drop-off location), thus significantly enhancing occupant's convenience and saving occupant's walking time and effort.

In some aspects, the system 108 may additionally or alternatively obtain user/occupant preferences from the vehicle 106 and/or the user device and may determine the optimal drop-off location based on the user preferences. For example, if the user prefers to take stairs (as opposed to an elevator) while walking towards the hotel room in the hotel, the system 108 may determine an optimal hotel drop-off location that may be closest to the hotel room and may require the user to take stairs while walking from the drop-off location to the hotel room. On the other hand, if the user prefers to take the elevator while moving towards the hotel room in the hotel, the system 108 may determine an optimal hotel drop-off location that may be closest to the hotel room and may enable the user to take the elevator while moving from the drop-off location to the hotel room. The system 108 may determine the optimal drop-off location based on other user preferences as well, e.g., presence of a coffee machine and/or a hotel restaurant in the path towards the hotel room, presence of a gym or the front desk in the path towards the hotel room, and/or the like.

In further aspects, the system 108 may additionally or alternatively obtain weather condition information associated with the geographical area 102 and/or the hotel from the external server and may determine the optimal drop-off location based on the weather condition information. As an example, if the weather condition indicates that it may be raining or snowing in the geographical area 102, the system 108 may determine an optimal drop-off location that may include a shade or a covered top portion (as opposed to an open drop-off location) so that the user/occupant may not get wet.

In a second exemplary aspect, when the building 104 may be a shopping mall, an office, or a store, the system 108 may obtain building information that may be similar to the hotel information described above. Specifically, the system may obtain the building location (i.e., "destination location"), the building map (or "destination location map"), and the information associated with a site of interest in the destination location. In this case, the information associated with the site of interest may be an identifier of a store or a shop (e.g., shop number) that the user may desire to visit. In this case also, the system 108 may obtain the destination location, the destination location map and the information associated with the site of interest in the destination location from one or more of the vehicle 106, the user device, the external server and/or the computing devices associated with the building 104.

Similar to the aspect described above, in this aspect as well, the system 108 may determine an optimal drop-off location at the building 104, such that the drop-off location may be closest to the site of interest (e.g., the store or the shop) in the building 104. Further, in this aspect, the system 108 may additionally determine whether the exit location associated with the building 104 may be different than the optimal drop-off location based on the building map (or the destination location map). When the system 108 determines that the exit location may be different from the determined optimal drop-off location, the system 108 may generate a movement notification or another set of navigation instructions and transmit the movement notification to the vehicle 106 and/or the user device. The movement notification may enable the vehicle 106 and/or the user device to move from the optimal drop-off location to the exit location. Specifically, the movement notification may include navigation instructions that may enable the vehicle 106 and/or the user device to navigate from the optimal drop-off location to the exit location. When the vehicle 106 may be stationed at the exit location (or in proximity to the exit location), the user may find it convenient to board the vehicle 106 when the user exits the building 104.

In a third exemplary aspect, when the building 104 may be a stadium, an arena, a sports complex, a concert venue or a convention center, the system 108 may obtain the building information that may be similar to the hotel information described above. Further, in this case, the information associated with the site of interest may be an identifier of a sitting area (e.g., a sitting area number) booked by or allocated to the user. In this case also, the system 108 may obtain the building information from one or more of the vehicle 106, the user device, the external server and/or the computing devices associated with the building 104.

In this aspect, the system 108 may determine an optimal drop-off location at the building 104, such that the determined drop-off location is associated with a shortest walking distance for the user from the drop-off location to the booked/allocated sitting area. In further aspects, the determined drop-off location may be associated with a shortest travel time (vehicle driving time and user walking time) from the vehicle/user device's real-time location to the booked/allocated sitting area. In yet another aspect, the determined drop-off location may be nearest to a place of interest (e.g., a refreshment center/station) in the building 104.

In further aspects, the system 108 may determine the optimal drop-off location such that the drop-off location may be close to an authorities post/station at the building 104 (e.g., close to an area where the Police/guards may be stationed), or close to an area with a highest population density at the building 104, or close to an area having a maximum count of infrastructure sensors or sensor suites (e.g., cameras, microphones, etc.). The system 108 may determine such drop-off locations based on user preferences provided by the vehicle 106 and/or the user device.

In additional aspects, when the user exits the vehicle 106 at the optimal drop-off location and starts to walk towards the site of interest (i.e., the hotel room, the sitting area at the stadium, the store at the shopping mall, etc.), the system 108 may generate navigation instructions based on the building map (or the destination location map) to facilitate the user move/walk from the drop-off location to the site of interest. The system 108 may further transmit the generated navigation instructions to the user device, which may output the navigation instructions as visual or voice commands, or as haptic feedback. In this manner, the system 108 facilitates the user to conveniently reach to the site of interest at the building 104.

Further system details are described below in conjunction with FIG. 2.

The vehicle 106 and the system 108 implement and/or perform operations, as described here in the present disclosure, in accordance with the owner manual and safety guidelines. In addition, any action taken by the user/occupant associated with the vehicle 106 based on the notifications/recommendations provided by the system 108 should comply with all the rules specific to the location and operation of the vehicle 106 (e.g., Federal, state, country, city, etc.). The notifications, as provided by the system 108 should be treated as suggestions and only followed according to any rules specific to the location and operation of the vehicle 106.

Figure 2:
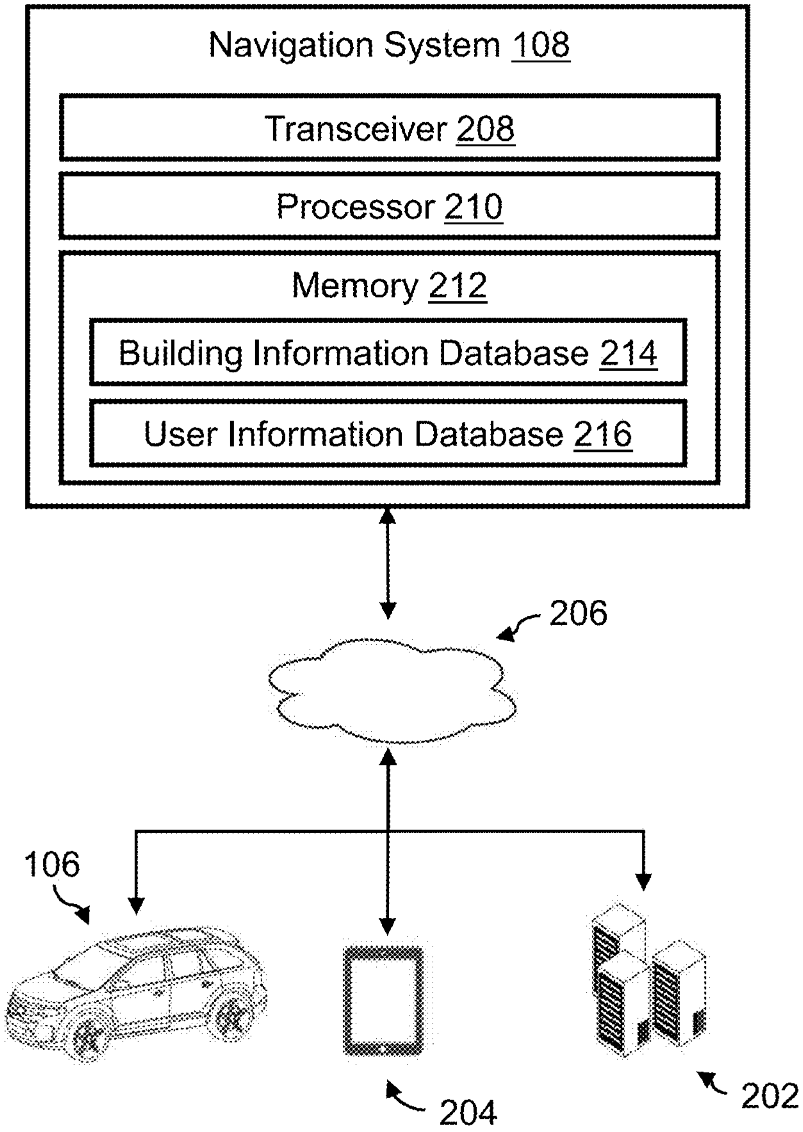
FIG. 2 depicts a block diagram of a navigation system in accordance with one or more embodiments of the present disclosure.

FIG. 2 depicts a block diagram of the navigation system 108 in accordance with the present disclosure. While describing FIG. 2, references will be made to FIGS. 3-5. As described above, the system 108 may be hosted on a server (e.g., a navigation server or a server communicatively coupled with one or more navigation based applications/systems).

The system 108 may be communicatively coupled with the vehicle 106, one or more servers 202 (or server 202), a user device 204, computing systems (not shown) associated with the building 104 via one or more networks 206 (or network 206). The server 202 may be part of a cloud-based computing infrastructure and may be associated with and/or include a Telematics Service Delivery Network (SDN) that provides digital data services to the vehicle 106 and/or the system 108. In further aspects, the server 202 may be configured to store information associated with the building 104 (or "building information") and transmit the building information to the system 108 for storage purpose. The building information may include, for example, the building location/address, the building map (e.g., the hotel map 110), and/or the like. In additional aspects, the server 202 may be configured to store user preferences associated with the user/occupant in the vehicle 106 and transmit the user preferences to the system 108 for storage purpose. In further aspects, the server 202 may be configured to obtain and transmit weather condition information associated with the geographical area 102 (including the building 104) to the system 108.

The user device 204 may be associated with the vehicle operator or the user/occupant in the vehicle 106 and may be, for example, a mobile phone, a laptop, a computer, a tablet, a wearable device, or any other device with communication capabilities.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The system 108 may include a plurality of units including, but not limited to, a transceiver 208, a processor 210 and a memory 212. The transceiver 208 may be configured to transmit/receive information/data to/from external systems and devices via the network 206. For example, the transceiver 208 may be configured to receive/transmit inputs/information/data from/to the vehicle 106, the user device 204, the server 202, the computing systems associated with the building 104, and/or the like.

The processor 210 may be disposed in communication with one or more memory devices disposed in communication with the respective computing systems (e.g., the memory 212 and/or one or more external databases not shown in FIG. 2). The processor 210 may utilize the memory 212 to store programs in code and/or to store data for performing aspects in accordance with the disclosure. The memory 212 may be a non-transitory computer-readable storage medium or memory storing a program code that enables the processor 210 to perform operations in accordance with the present disclosure. The memory 212 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 212 may include a plurality of databases including, but not limited to, a building information database 214 and a user information database 216. The building information database 214 may store the building information that the system 108 may obtain from the server 202 and/or the computing systems associated with the building 104. The user information database 216 may store information associated with the user/occupant in the vehicle 106 including, but not limited to, the user preferences, the digital key 112, the information associated with the site of interest (e.g., the hotel room, the stadium sitting area, the shopping mall store, etc.) in the destination location or the building 104, and/or the like. The system 108 may receive some or all of the information associated with the user/occupant in the vehicle 106 from the user device 204, the vehicle 106, the server 202, and/or the like.

In operation, the transceiver 208 may receive the building information (or the destination location information) and the information associated with the site of interest in the building 104/destination location, when the vehicle 106 may be travelling towards the building 104 or located at a vehicle's home location. In some aspects, the transceiver 208 may receive the building information (i.e., the building address and the building map) and the information associated with the site of interest in the building 104 from one or more of the vehicle 106, the user device 204, the server 202 and/or the computing systems associated with the building 104. Responsive to receiving the information described above, the transceiver 208 may transmit the information to the processor 210 and to the respective memory databases for storage purpose.

The processor 210 may obtain the information from the transceiver 208 and may determine an optimal drop-off location, from a plurality of drop-off locations, at the building 104 based on the information associated with the site of interest and the building map, as described above in conjunction with FIG. 1. Specifically, the processor 210 may correlate the information associated with the site of interest and the building map to determine the optimal drop-off location. The processor 210 may further determine a real-time location of the vehicle 106 and/or the user device 204 by obtaining the real-time location from the vehicle 106 and/or the user device 204.

Figure 3:
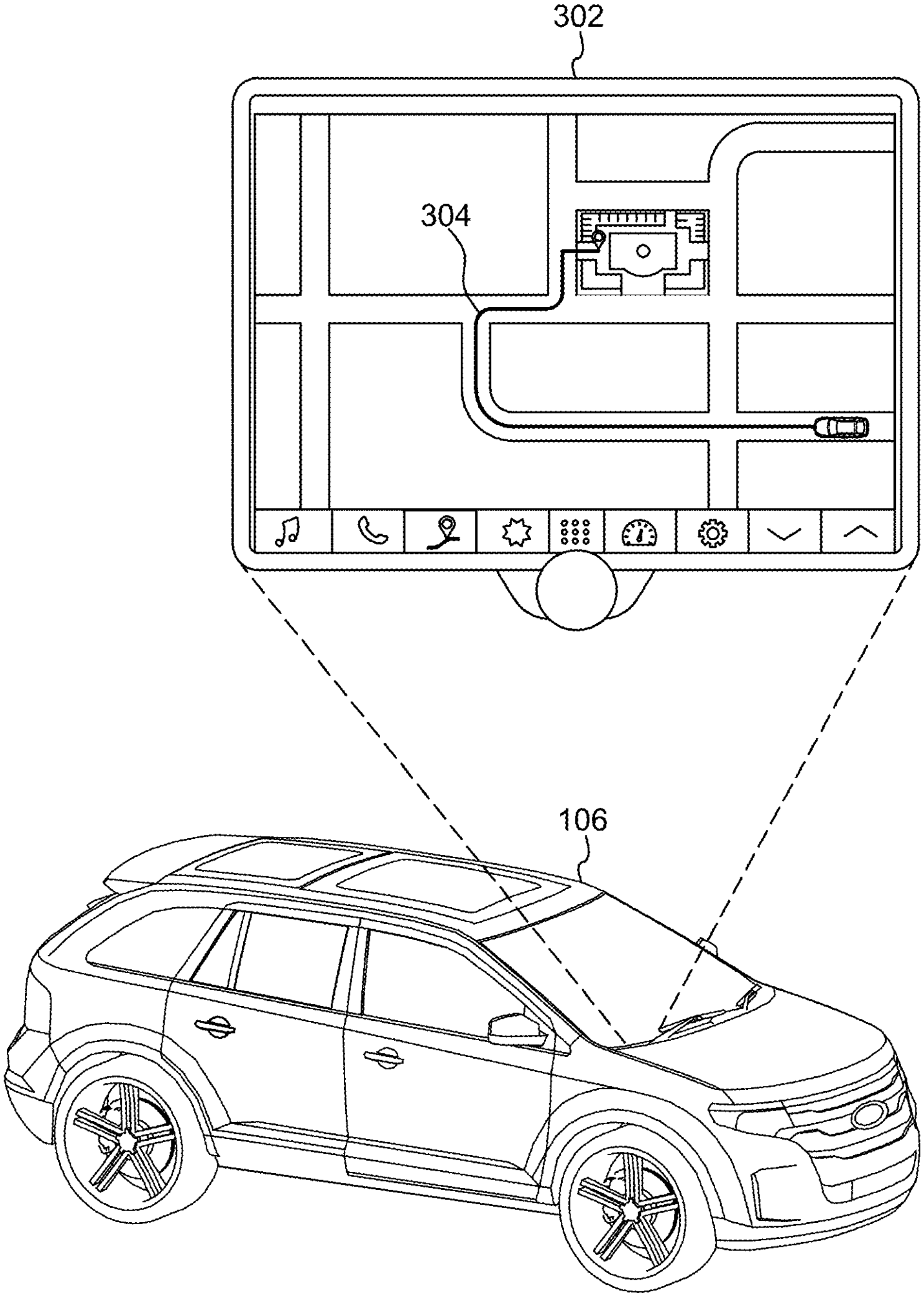
FIG. 3 depicts a snapshot of a vehicle Human-Machine Interface (HMI) displaying first navigation instructions in accordance with one or more embodiments of the present disclosure.

Responsive to determining the optimal drop-off location and the real-time vehicle/user device location, the processor 210 may generate first navigation instructions to navigate the vehicle 106 or the user device 204 from the real-time vehicle/user device location to the optimal drop-off location. The processor 210 may further transmit, via the transceiver 208 and the network 206 or vehicle-to-infrastructure (V2I) communication, the first navigation instructions to the vehicle 106/user device 204. The vehicle 106/user device 204 may then display the first navigation instructions, and the vehicle operator may follow the instructions to drive the vehicle 106 from its real-time location to the determined optimal drop-off location. An example view of a vehicle Human-Machine Interface (HMI) 302 displaying first navigation instructions 304 is depicted in FIG. 3. In some aspects, the first navigation instructions 304 may connect the real-time vehicle location with the determined optimal drop-off location, thereby facilitating the vehicle operator to conveniently drive to the optimal drop-off location. In other aspects, when the vehicle 106 may be an autonomous vehicle, the vehicle 106 may autonomously move/travel towards the optimal drop-off location responsive to receiving the first navigation instructions from the processor 210/transceiver 208.

In a first exemplary aspect, when the building 104 may be a hotel, the information associated with the site of interest may be an identifier of a hotel room (e.g., a room number)

booked by the user/occupant of the vehicle 106. In this aspect, the transceiver 208 may be further configured to receive the digital key 112 from the vehicle 106, the user device 204, the server 202, and/or the like, and the transceiver 208 may transmit the digital key 112 to the processor 210. The digital key 112 may include the information associated with the site of interest/hotel room booked by the user, and the processor 210 may be configured to fetch the information associated with the site of interest from the digital key 112.

In this aspect, the processor 210 may determine the optimal drop-off location such that the drop-off location may a hotel entrance closest to the hotel room. The processor 210 may determine the hotel entrance/drop-off location closest to the hotel room by correlating the information associated with the site of interest/hotel room with the building/hotel map. In some aspects, the processor 210 may further enable the computing systems associated with the building 104 and/or the infrastructure sensors installed at the building 104 to transmit a route, to the determined optimal drop-off location, to the vehicle 106 ahead of time or before the vehicle 106 reaches the building 104 (or the destination location). The computing systems associated with the building 104 and/or the infrastructure sensors may transmit the route to the vehicle 106 via V2I communication. In further aspects, for the entire duration of user's stay at the hotel, anytime the user requests a vehicle, taxi, etc. to drop-off the user at the hotel, the drop-off location may be the location that is closest to the hotel room. Furthermore, if V2I communication is not available, the vehicle 106 may drop a "pin" (e.g., a location identifier) at the determined drop-off location, and the vehicle 106 may then remember the route for future travels to the hotel when the vehicle 106 drops-off the user.

In further aspects, the transceiver 208 may receive inputs associated with user preferences of the user/occupant in the vehicle 106 from the user device 204, the server 202, the vehicle 106, and/or the like. The transceiver 208 may transmit the inputs associated with user preferences to the user information database 216 for storage purpose and/or to the processor 210. In some aspects, the processor 210 may determine the optimal drop-off location at the hotel/building 104 based on the inputs associated with user preferences. For example, if the user prefers to take stairs (or an elevator) at the hotel, the processor 210 may determine that drop-off location for the user that may require the user to take the stairs (or the elevator), when the user walks from the drop-off location to the hotel room booked by the user.

In a second exemplary aspect, when the building 104 may a shopping mall, a store, or an office, the information associated with the site of interest may be an identifier associated with a store or an office section to be visited by the user/occupant of the vehicle 106. In this aspect too, the processor 210 may obtain the building information, the user preferences, and the information associated with the site of interest from the vehicle 106, the user device 204, the server 202, and/or the like, and the processor 210 may determine an optimal drop-off location at the building 104 based on the obtained information. In this case, the optimal drop-off location may be an entrance to the shopping mall or the office that may be closest to the store or the office section to be visited by the user.

Figure 4:
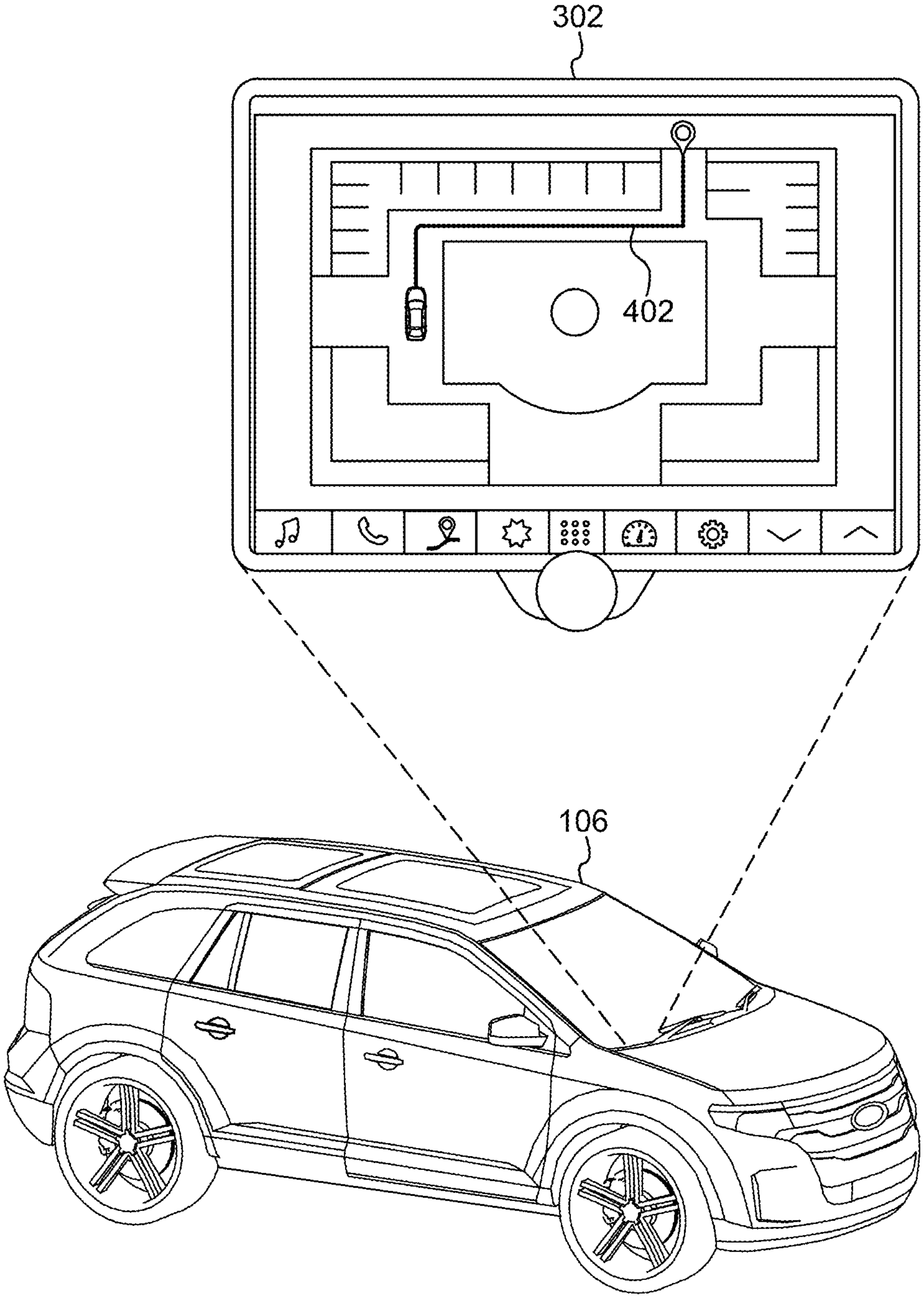
FIG. 4 depicts a snapshot of a vehicle HMI displaying second navigation instructions in accordance with one or more embodiments of the present disclosure.
Figure 5:
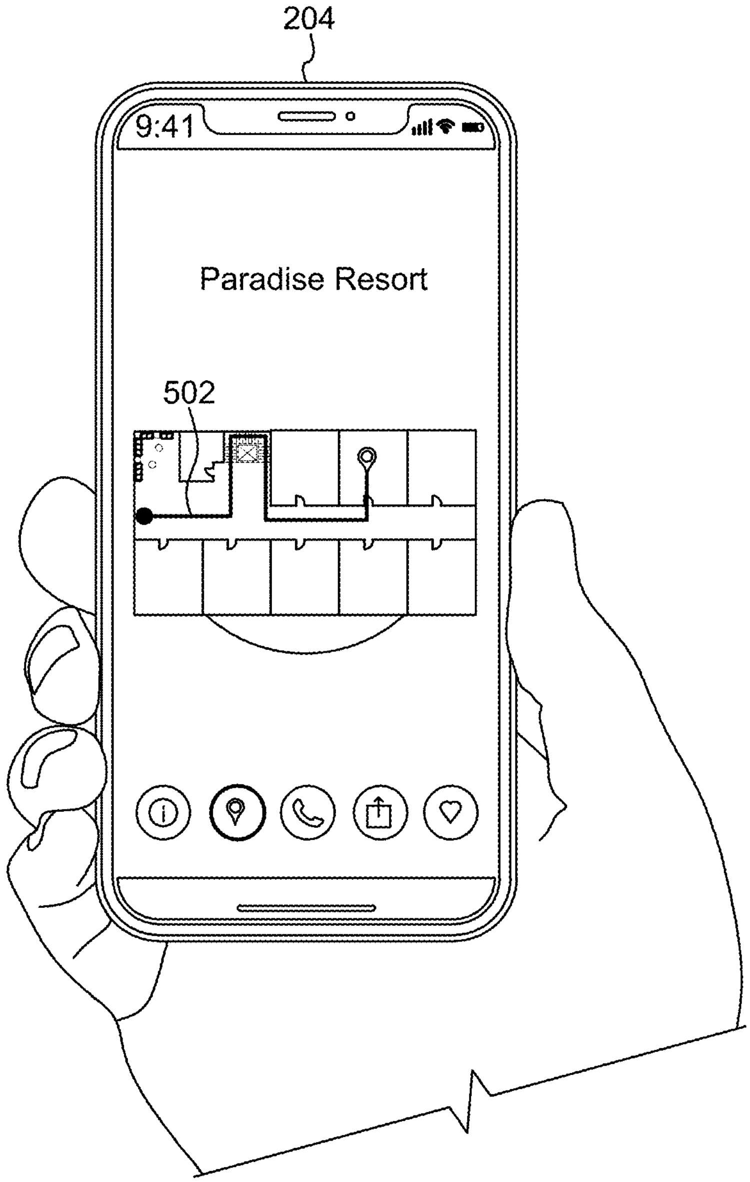
FIG. 5 depicts a snapshot of a user interface displaying third navigation instructions in accordance with one or more embodiments of the present disclosure.

In further aspects, in this case, the processor 210 may determine an exit location associated with the shopping mall or the office based on the building/destination location map. Responsive to determining the exit location, the processor 210 may determine that the exit location may be different from the determined optimal drop-off location. Responsive to such determination, the processor 210 may generate a movement notification or second navigation instructions to enable a vehicle or user device movement from the optimal drop-off location to the exit location. The processor 210 may then transmit, via the transceiver 208, the movement notification or the second navigation instructions to the vehicle 106 and/or the user device 204. The vehicle 106 and/or the user device 204 may display the second navigation instructions responsive to receiving them from the processor 210/transceiver 208, as shown in FIG. 4. Specifically, as shown in FIG. 4, the vehicle HMI 302 may display second navigation instructions 402, which may facilitate the vehicle operator to travel from the drop-off location to the exit location. In particular, when the vehicle 106 drops-off the user at the drop-off location, the vehicle operator may use the second navigation instructions 402 to travel from the drop-off location to the exit location. If the vehicle 106 is an autonomous vehicle, the vehicle 106 may autonomously travel from the drop-off location to the exit location, responsive to receiving the movement notification or the second navigation instruction from the processor 210/transceiver 208. A person ordinarily skilled in the art may appreciate that the user may find it convenient to board the vehicle 106 after exiting the building 104, when the vehicle 106 may be located in proximity to the exit location. In this manner, the system 108 not only facilitates in dropping-off the user at the optimal drop-off location, but also facilitates in enabling the user to conveniently board the vehicle 106 after exiting the building 104.

In some aspects, the transceiver 208 may be additionally configured to receive weather condition information associated with the geographical area 102/building 104 from the server 202, and the processor 210 may be configured to determine the optimal drop-off location based on the weather condition information. For example, when the weather condition information indicates that it may be raining or snowing in the geographical area 102, the processor 210 may identify that drop-off location in the building 104 that may have a covered top portion, to prevent the user from getting wet when the user exits the vehicle 106 and moves to the store/office section/hotel room at the shopping mall/office/hotel.

In a third exemplary aspect, when the building 104 may a stadium, an arena, a sports complex, a concert venue, a convention center, and/or the like, the information associated with the site of interest may be an identifier associated with a sitting area booked by the user/occupant of the vehicle 106. In this aspect also, the processor 210 may obtain the building information, the user preferences, and the information associated with the site of interest from the vehicle 106, the user device 204, the server 202, and/or the like, and the processor 210 may determine an optimal drop-off location at the building 104 based on the obtained information. As a first example, in this case, the optimal drop-off location may be a drop-off location, from the plurality of drop-off locations at the building 104, which may be associated with a shortest walking distance for the user from the optimal drop-off location to the sitting area booked by the user. As a second example, the optimal drop-off location may be a drop-off location that may be associated with a shortest travel time (including vehicle driving/travel time and user walking time) from the real-time vehicle/user device location to the sitting area booked by the user. As a third example, the optimal drop-off location may be a drop-off location that may be nearest to a place of interest (e.g., a refreshment station) in the stadium, as determined based on the user preferences and the building map. Stated another way, in this example, the user may pass the refreshment station when the user may be walking from the drop-off location to the sitting area booked by the user. As a fourth example, the optimal drop-off location may be a drop-off location that may provide a fastest route to user's home when the event at the stadium may be over (thereby minimizing the need for the user to sit at the stadium parking lot for long time durations). The processor 210 may determine such drop-off locations based on historical pattern of user and vehicle movements at the stadium.

In yet another exemplary aspect, the processor 210 may determine the optimal drop-off location based on user preferences such that the drop-off location may be closest to a highest population density area at the building 104/destination location. In this aspect, the processor 210 may obtain/leverage phone data (or signals from user devices located at the building 104) to determine such population density area at the building 104. In further aspects, the optimal drop-off location may be located in an area in the building 104/destination location having a presence of authorities (e.g., Police, guards, etc.). In this aspect, the processor 210 may obtain/leverage inputs obtained from the infrastructure sensors and/or computing systems associated with the building 104 to determine such an area in the building 104. In yet another aspect, the optimal drop-off location may be located in an area in the building 104/destination location having an abundance of infrastructure sensors or presence of an infrastructure sensor suite (e.g., cameras).

In further aspects, the system 108 may facilitate the user to conveniently walk/move from the drop-off location to the hotel room/sitting area/office section/shop/store at the building 104, when the user exits the vehicle 106 at the drop-off location. In this case, the processor 210 may generate third navigation instructions to navigate the user device 204 from the optimal drop-off location to the site of interest in the building 104 based on the building/destination location map. The processor 210 may further transmit, via the transceiver 208, the third navigation instructions to the user device 204 via the network 206. The user device 204 may display the third navigation instructions for user's convenience, depicted as third navigation instructions 502 in FIG. 5.

In some aspects, the user device 204 may output the third navigation instructions audibly, visually and/or via haptic feedback. In the latter case, the user device 204 may output different combinations of vibrations and then subsequent pauses to provide an indication to the user to move forward, turn right, turn left, move up or down the stairs or the elevator, and/or the like. Furthermore, if the user may be wearing an augmented reality head set, the processor 210 may transmit the third navigation instructions to the head set, which may display the directions/distance the user should follow to reach to the site of interest in the building 104.

Figure 6:
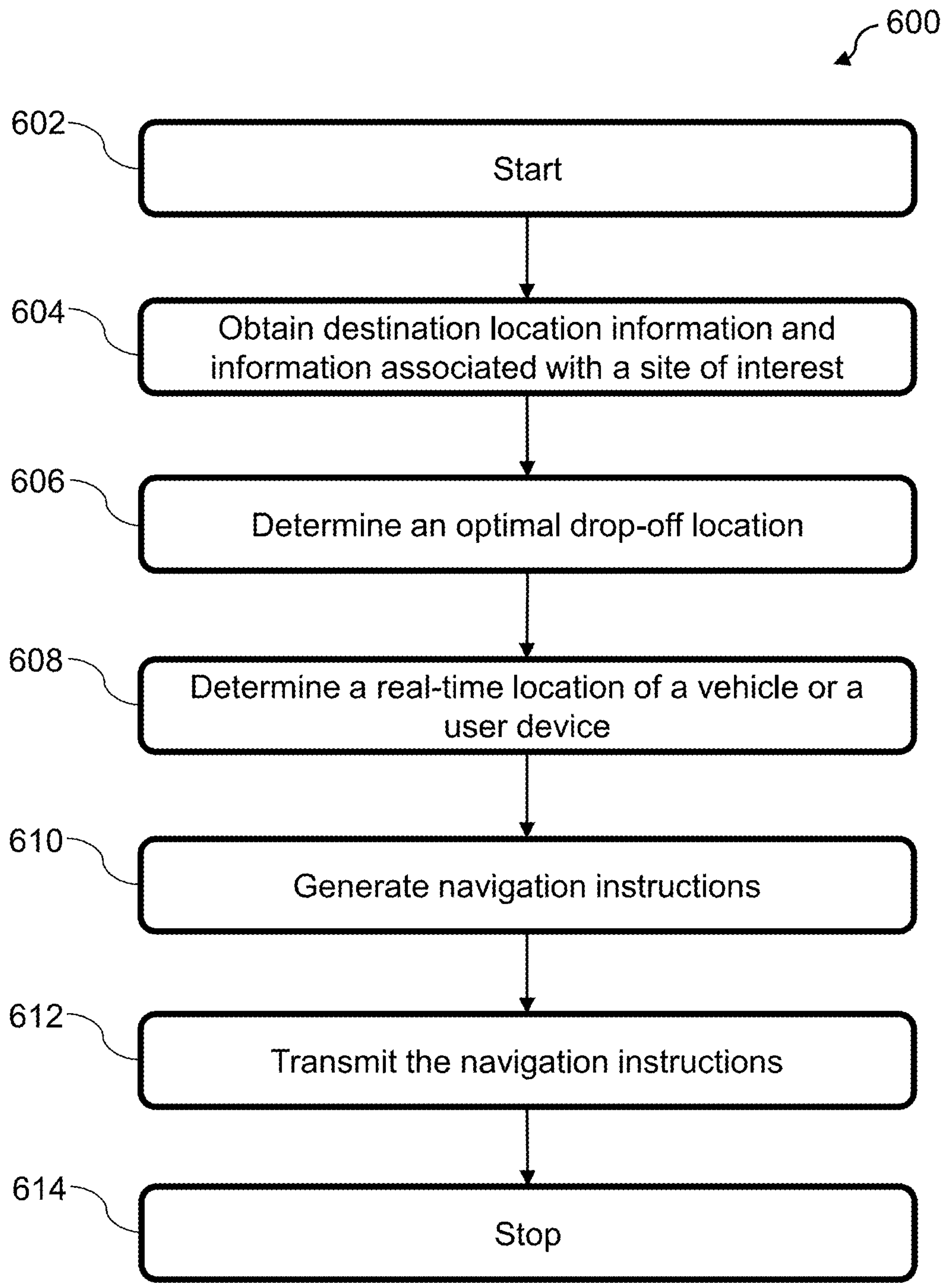
FIG. 6 depicts a flow diagram of a navigation method in accordance with one or more embodiments of the present disclosure.

FIG. 6 depicts a flow diagram of an example navigation method 600 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 210, the destination location information (e.g., the destination location/address and the destination location map) and the information associated with the site of interest in the destination location/building 104. At step 606, the method 600 may include determining, by the processor 210, the optimal drop-off location, from a plurality of drop-off locations, at the destination location/building 104 based on the information associated with the site of interest and the destination location map. At step 608, the method 600 may include determining, by the processor 210, a real-time location of the vehicle 106 or the user device 204.

At step 610, the method 600 may include generating, by the processor 210, navigation instructions to navigate the vehicle 106 or the user device 204 from the real-time location to the optimal drop-off location. At step 612, the method 600 may include transmitting, by the processor 210, the navigation instructions to the vehicle 106 or the user device 204.

At step 614, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:

a vehicle comprising a transceiver; and a navigation system comprising a processor communicatively coupled with the vehicle via the transceiver, wherein the processor is configured to:

receive a destination location, a destination location map, and a digital key comprising information associated with a site of interest in the destination location;

determine an optimal drop-off location, from a plurality of drop-off locations, at the destination location based on the information associated with the site of interest and the destination location map;

determine a real-time location of the vehicle or a user device;

generate first navigation instructions to navigate the vehicle or the user device from the real-time location to the optimal drop-off location; and transmit the first navigation instructions to the vehicle or the user device, wherein the vehicle is an autonomous vehicle that autonomously navigates to the optimal drop-off location responsive to receiving the first navigation instructions.

2. The system of claim 1, wherein the destination location is a hotel and the information associated with the site of interest is an identifier of a hotel room booked by a user.

3. The system of claim 2, wherein the digital key is associated with the hotel room, and wherein the digital key comprises the information associated with the site of interest.

4. The system of claim 2, wherein the optimal drop-off location is a drop-off location, from the plurality of drop-off locations, that is closest to the hotel room.

5. The system of claim 2, wherein the processor is further configured to receive inputs associated with user preferences, and further configured to determine the optimal drop-off location based on the user preferences.

6. The system of claim 5, wherein the user preferences are associated with use of stairs or elevators in the hotel.

7. The system of claim 1, wherein the processor transmits the first navigation instructions to the vehicle via a vehicle-to-infrastructure (V2I) communication.

8. The system of claim 1, wherein the processor is further configured to receive weather condition information associated with the destination location, and to determine the optimal drop-off location based on the weather condition information.

9. The system of claim 1, wherein the destination location is a shopping mall or an office and the information associated with the site of interest is an identifier associated with a store or an office section to be visited by a user.

10. The system of claim 9, wherein the optimal drop-off location is an entrance to the shopping mall or the office that is closest to the store or the office section.

11. The system of claim 10, wherein the processor is further configured to:

determine an exit location associated with the shopping mall or the office based on the destination location map;

determine that the exit location is different from the optimal drop-off location; and transmit a movement notification to the vehicle or the user device to enable a vehicle movement or a user device movement from the optimal drop-off location to the exit location, responsive to determining that the exit location is different from the optimal drop-off location.

12. The system of claim 1, wherein the destination location is a stadium and the information associated with the site of interest is an identifier associated with a sitting area booked by a user.

13. The navigation system of claim 12, wherein the optimal drop-off location is a drop-off location, from the plurality of drop-off locations, associated with a shortest walking distance for the user from the optimal drop-off location to the sitting area.

14. The system of claim 12, wherein the optimal drop-off location is a drop-off location, from the plurality of drop-off locations, associated with a shortest travel time from the real-time location to the sitting area.

15. The system of claim 12, wherein the optimal drop-off location is a drop-off location, from the plurality of drop-off locations, that is nearest to a place of interest in the stadium.

16. The system of claim 1, wherein the optimal drop-off location is a drop-off location, from the plurality of drop-off locations, that is closest to at least one: a highest population density area at the destination location, an area in the destination location having a presence of authorities, or an area in the destination location having an infrastructure sensor suite.

17. The system of claim 1, wherein the processor is further configured to:

generate second navigation instructions to navigate the user device from the optimal drop-off location to the site of interest based on the destination location map; and transmit the second navigation instructions to the user device.

18. The system of claim 1, wherein the processor determines the real-time location by obtaining the real-time location from the user device or the vehicle.

19. A navigation method comprising:

obtaining, by a processor, a destination location, a destination location map and a digital key comprising information associated with a site of interest in the destination location;

determining, by the processor, an optimal drop-off location, from a plurality of drop-off locations, at the destination location based on at least the digital key and the destination location map;

determining, by the processor, a real-time location of a vehicle or a user device;

generating, by the processor, navigation instructions to navigate the vehicle or the user device from the real-time location to the optimal drop-off location; and transmitting, by the processor, the navigation instructions to the vehicle or the user device, wherein the vehicle is an autonomous vehicle that autonomously navigates to the optimal drop-off location responsive to receiving the navigation instructions.

20. A non-transitory computer-readable storage medium having instructions stored thereupon which, when executed by a processor, cause the processor to:

obtain a destination location, a destination location map and a digital key comprising information associated with a site of interest in the destination location;

determine an optimal drop-off location, from a plurality of drop-off locations, at the destination location based on at least the digital key and the destination location map;

determine a real-time location of a vehicle or a user device;

generate navigation instructions to navigate the vehicle or the user device from the real-time location to the optimal drop-off location; and transmit the navigation instructions to the vehicle or the user device, wherein the vehicle is an autonomous vehicle that autonomously navigates to the optimal drop-off location responsive to receiving the navigation instructions.

* * * * *